United States Patent [19]

Dyrup

[11] 4,150,848
[45] Apr. 24, 1979

[54] COUPLING FOR NON-METALLIC HOSE

[75] Inventor: Sven-Erik Dyrup, Oxie, Sweden

[73] Assignee: Trelleborg Aktiebolag, Trelleborg, Sweden

[21] Appl. No.: 850,066

[22] Filed: Nov. 9, 1977

[30] Foreign Application Priority Data

Sep. 9, 1977 [DE] Fed. Rep. of Germany ... 7727938[U]

[51] Int. Cl.² ............................................ F16L 33/00
[52] U.S. Cl. ..................................... 285/238; 285/328; 285/414
[58] Field of Search ............... 285/414, 238, 243, 248, 285/252, 253, 256, 257, 254, 373, 419, 149, 328

[56] References Cited

U.S. PATENT DOCUMENTS

| 2,273,398 | 2/1942 | Couty et al. ..................... 285/256 X |
| 4,064,614 | 12/1977 | Horvath ................................ 285/256 |

FOREIGN PATENT DOCUMENTS

| 2258207 | 8/1973 | Fed. Rep. of Germany ........... 285/258 |
| 2212896 | 9/1973 | Fed. Rep. of Germany ........... 285/363 |
| 1385668 | 2/1975 | United Kingdom ..................... 285/414 |

*Primary Examiner*—Dave W. Arola
*Attorney, Agent, or Firm*—Meyer, Tilberry & Body

[57] ABSTRACT

A hose coupling is provided which is comprised of two semi-circular coupling halves bolted together around the outer surface of the end of a non-metallic hose. The inner surface of each coupling half is provided with a metal plate having a multiplicity of prongs struck from the metal of the plate to extend radially inwardly for penetrating the non-metallic hose. All of the prongs extend circumferentially of the hose to facilitate penetration of the hose during assembly of the coupling halves and to maximize retention of the coupling on the hose end.

10 Claims, 6 Drawing Figures

COUPLING FOR NON-METALLIC HOSE

This invention relates to the art of couplings and, more particularly, to an improved coupling for the end of a non-metallic hose.

The hose coupling of the present invention is particularly suited for use with hose intended to handle the transportation of abrading materials such as particles or ore dispersed in a fluid medium. However, it will be appreciated that the coupling can be employed with non-metallic hose in general and hose used to transport materials other than abrasive containing fluids.

In connection with the transportation of abrasive containing fluid materials by non-metallic hose, it is desirable to provide a coupling structure mountable on a hose end for connection with a like coupling on an axially opposed hose end or on a container or the like from or to which the material is to be transported. The present invention relates to such a coupling and is an improvement in the coupling disclosed in a British Pat. No. 1,385,668. The hose coupling disclosed in this patent has two semi-circular coupling halves adapted to be clamped together to grip the outer side of a hose end therebetween. Each of the coupling halves is provided with two diametrically opposed, radially outwardly directed flanges extending axially along the hose coupling and by which the coupling halves are connected together. Further, each of the coupling halves is provided with a flange disposed at one end thereof and extending radially outwardly transverse to the axial direction of the hose coupling and by which the coupling can be connected to a similar hose coupling. Each of the coupling halves is further provided with a semi-circular metal sheet affixed to the inner side of the coupling half and formed with inwardly directed prongs extending both axially and circumferentially of the coupling. When the coupling halves are assembled about the end of a hose, the prongs penetrate the outer surface of the hose to interengage the latter with the coupling and against axial separation therefrom.

The hose coupling disclosed in the above-identified British patent is often difficult to mount on a hose end and does not provide the optimum strength against separation from the hose. In this respect, the prongs are directed both circumferentially and axially of the coupling and are provided by punching the metal sheet to provide openings surrounded on all four sides by radially inwardly directed prongs. The perpendicular relationship between adjacent ones of the prongs and the close proximity to one another of the four prongs surrounding a given opening restrains penetration of the hose by the prongs. In particular, the axially extending prongs obstruct penetration of the hose in areas thereof other than the area midway between the diametrically opposite ends of each coupling half. In this respect, the axially extending prongs in the areas of the coupling halves approaching the diametrically opposite ends thereof provide planar surfaces extending axially of the coupling halves and projecting radially inwardly thereof. These axially extending projections obstruct penetration of the hose in that the coupling halves are assembled about the hose end by movement of the coupling halves diametrically toward one another with the hose interposed therebetween. Thus, the axially extending prongs approaching the diametrically opposite ends of the coupling halves facially engage the hose surface, and this engagement tends to bend the prongs toward the plane of the metal sheet thus to prevent achieving penetration of the hose by the prongs.

Accordingly, mounting of the coupling halves on a hose end is very difficult and, in the absence of full penetration of the prongs into the hose, the resulting coupling is not as strong as is desired with respect to restraining axial separation between the hose and coupling. Moreover, such bending of the prongs prevents the outer surface of the hose from fully engaging the surface area of the metal plate between the prongs and this distorts the hose from the desired circular contour thereof. Still further, those prongs which extend axially of the coupling provide longitudinal slits in the hose material upon penetration thereof and, upon an axial force being imposed on the hose tending to separate it from the coupling, such longitudinally extending prongs do not resist such axial separation but rather lend to such separation by promoting longitudinal slitting of the hose.

The improvement provided in accordance with the present invention advantageously enables overcoming the above disadvantages of the prior art coupling structure. In this respect, the radially inwardly directed prongs on the metal members of the coupling halves are provided in accordance with the present invention by striking the prongs from the metal plates to provide oblong openings through the plates having major axes extending circumferentially of the coupling and minor axes extending axially of the coupling. All of the prongs are attached to the metal sheet along corresponding root lines extending in the direction of the major axes, and each of the tabs has a knife edge between opposite ends of the corresponding root line.

By providing for all of the prongs to extend in the direction of the major axes of the openings, in other words circumferentially of the coupling, the knife edges of the prongs more readily penetrate the hose material and facilitate obtaining full penetration to the base of each prong. Particularly, in this respect, those prongs which are adjacent the diametrically opposite ends of each coupling half have the knife edges thereof directed such that diametrical movement of the coupling halves toward one another during the assembly operation results in circumferential slitting. This enables achieving penetration of the hose by the prongs without obstruction of such penetration as is caused by axially extending prongs as described hereinabove. Moreover, since all the prongs extend circumferentially, there is no axial slitting of the hose and, therefore, maximum retention against axial separation of the hose and coupling is achieved.

Preferably, the openings provided in the metal sheets in forming the prongs are ovate and the prongs are struck from the metal sheets to extend along axially opposite sides of the openings. The ovate opening provides for each of the prongs to lie in a curved plane which intersects the metal sheet along the corresponding root line and provides for the knife edge of each prong to be arcuate and to lie in the plane of the corresponding prong. The curved contour of the prongs resists bending thereof during an assembly operation.

It is accordingly an outstanding object of the present invention to provide an improved coupling for non-metallic hose and in which the coupling is of the character having diametrically opposed coupling halves provided with radially inwardly directed prongs for penetrating the hose upon assembly of the coupling halves thereabout.

A further object is the provision of a coupling of the foregoing character in which all of the prongs are oriented on the coupling halves to facilitate penetration of the prongs into the hose upon assembly of the coupling halves.

Another object is the provision of a coupling of the foregoing character in which the prongs are oriented to optimize retention of the hose against axial separation from the coupling.

Still a further object is the provision of a coupling of the foregoing character in which all of the prongs have knife edges extending generally circumferentially of the coupling halves.

Still another object is the provision of a coupling of the foregoing character which is structurally simple, more readily connectable to a hose end than heretofore possible and which enables increasing the strength and reliability of the coupling assembly.

The foregoing objects, and others, will in part be obvious and in part pointed out more fully hereinafter in conjunction with the written description of a preferred embodiment of the invention shown in the accompanying drawings in which.

Figure 1:
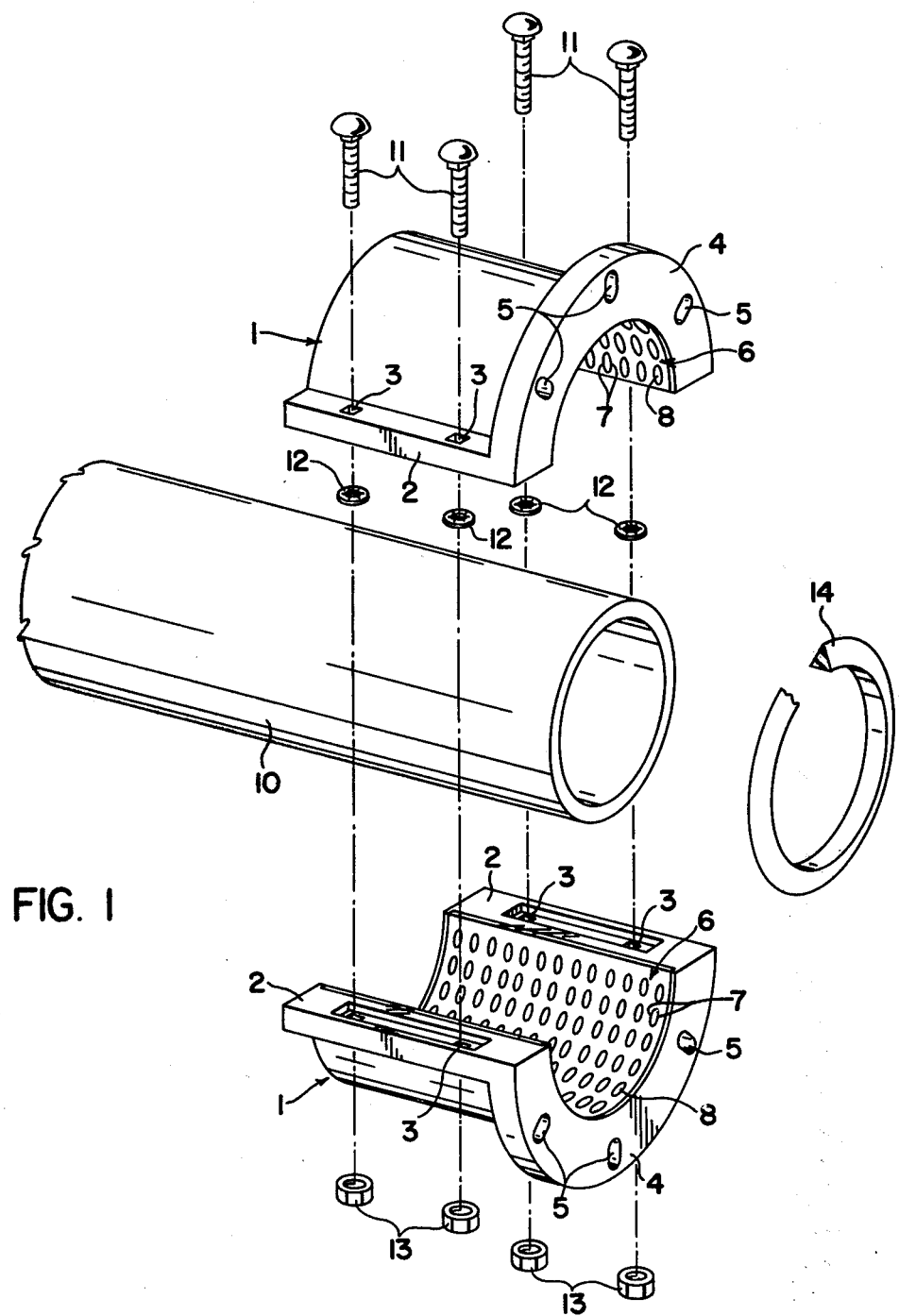
FIG. 1 is an exploded perspective view of a hose coupling of the present invention.

Referring now in greater detail to the drawings wherein the showings are for the purpose of illustrating a preferred embodiment of the invention only and not for the purpose of limiting the invention, a hose coupling is shown in FIG. 1 which is comprised of semi-circular coupling halves 1 which are of identical structure and configuration. Each coupling half has two diametrically opposed flanges 2 which extend axially along the coupling half and are directed radially outwardly therefrom. Flanges 2 are provided with holes 3 therethrough which, in the embodiment illustrated, are of quadrangular configuration to facilitate the tightening of mounting bolts, as will become apparent hereinafter. Each coupling half further includes a flange 4 at one end thereof and which is radially outwardly directed transversely of the axial direction of the hose coupling. Flanges 4 are provided with holes 5 therethrough which are preferably elliptical and the major axes of which extend radially with respect to the axis of the coupling. The purpose of elliptical holes 5 is to facilitate connection of flanges 4 of a pair of axially opposed coupling assemblies in the event that the pitch circles of the holes of the opposed couplings should not coincide.

As will be described in greater detail hereinafter, each coupling half is provided on its inner surface with a metal sheet 6 formed with a series of prongs 7 which have been punched or struck from the metal sheet to extend radially inwardly toward the axis of the hose coupling. Each metal sheet 6 is fastened to the corresponding coupling half in any suitable manner, such as by riveting, and it will be appreciated that the metal sheet overlies the inner semi-circular surface portion of the corresponding coupling half. The prongs 7 are in axially opposed pairs extending circumferentially along axially opposite sides of openings 8 which are formed by punching the prongs from metal sheets 6.

On mounting the coupling halves on the end of a nonmetallic hose 10, the two semi-circular coupling halves are brought diametrically together about the end of the hose, and the prongs 7 on sheets 6 successively cut into the hose material when the coupling halves are screwed together. As will become more apparent hereinafter, the cutting-into or penetration of the prongs into the hose is greatly facilitated by the fact that the prongs extend in the circumferential direction and in substantially diametrical planes, whereby the prongs cut into the hose material in a manner similar to knives as the coupling halves are brought together. In the embodiment illustrated, the coupling halves are secured together by means of bolts 11, the heads of which have square necks which engage the quadrangular holes 3 in the coupling halves to restrain rotation of the bolts. Retaining washers 12 engage the shanks of bolts 11 to retain the bolts on one of the coupling halves during the handling of the halves before nuts 13 are screwed onto the bolt shanks to complete the assembly operation. During assembly of the hose and coupling halves it is advantageous to allow the hose end to protrude somewhat beyond the flanges 4 and to sever the protruding hose material when the coupling halves are joined together. This provides a clean cut at the end of the couplings so that the hose material can be tightly engaged with a suitable sealing ring 14 preferably with substantially triangular cross-section interposed between the coupling and an opposed coupling or other component against which the coupling is to be secured.

Figure 2:
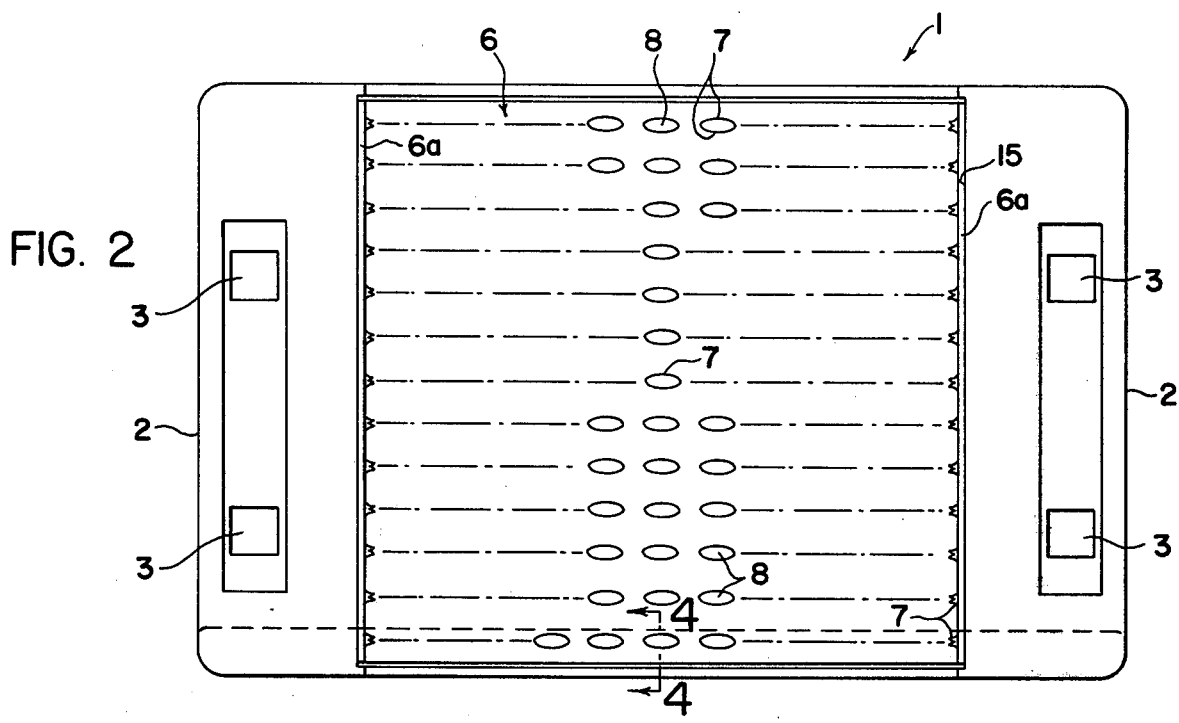
FIG. 2 is a plan view of one of the coupling halves.

Referring now in particular to FIGS. 2–6 of the drawing, it will be seen that semi-circular metal plate 6 is received in a circumferentially extending recess 15 in the corresponding coupling half 1 and that each of the openings 8 provided in connection with the formation of prongs 7 is ovate and has a major axis 8a extending circumferentially of the coupling half and a minor axis 8b extending axially of the coupling half. Prongs 7 are preferably formed by punching metal sheet 6 with a suitable punching tool or mandrel contoured to provide opening 8 and to displace and form the material of the metal sheet such that prongs 7 are formed on axially opposite sides of the opening to extend in the direction of major axis 8a and thus generally circumferentially of the coupling half. Each projection 7 thus remains attached to metal plate 6 along a corresponding root line 7a extending in the direction of the major axis, and each of the prongs has an outer knife edge 7b between the opposite ends of the corresponding root line. In forming openings 8 and prongs 7 in the foregoing manner, it will be appreciated that each of the prongs 7 lies in a corresponding curved plane intersecting the metal sheet along the corresponding root line and that the knife edge 7b of each prong lies in the corresponding curved plane. It will be further appreciated that the curved planes of each pair of prongs 7 at a given opening 8 are axially opposed and that the knife edges 7b are arcuate both in the direction of curvature of the plane and radially with respect to the coupling half. Preferably, as seen in FIG. 2, openings 8 and the pairs of prongs 7 on axially opposite sides thereof are formed in metal sheet 6 to provide a plurality of circumferentially extending rows axially spaced apart between the axially opposite ends of the metal sheet.

Figure 3:
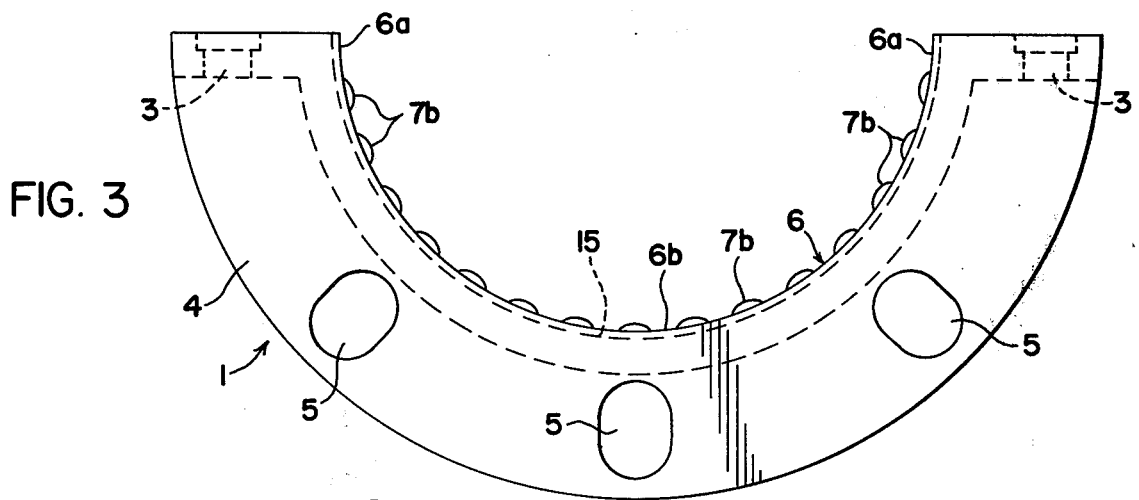
FIG. 3 is an end elevation view of one of the coupling halves.
Figure 5:
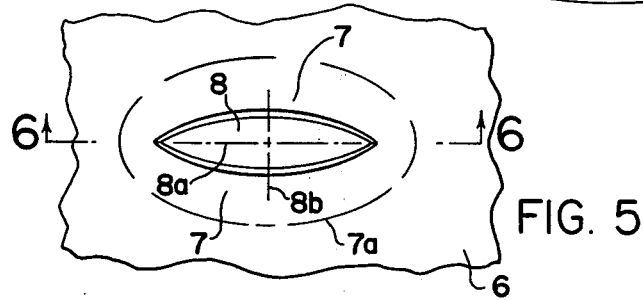
FIG. 5 is an enlarged plan view of a pair of prongs of the metal plate of one of the coupling halves; and, FIG. 6 is an enlarged sectional elevation view of a prong taken along line 6—6 in FIG. 2.
Figure 6:
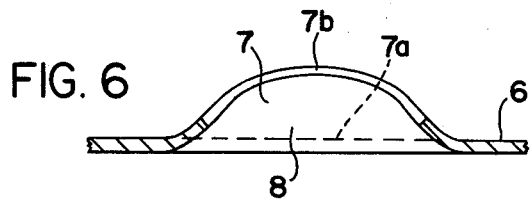
Figure 4:
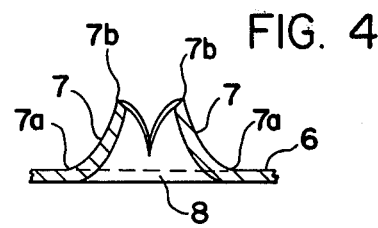
FIG. 4 is an enlarged cross-sectional view of a pair of prongs of the metal plate of a coupling half taken along line 4—4 of FIG. 2.

It will be appreciated from FIGS. 1, 2 and 3 that the circumferentially extending knife edges 7b of prongs 7 promote penetration of the non-metallic hose 10 when the coupling halves are brought together diametrically thereabout. More particularly in this respect, during such diametrical movement of the coupling halves knife edges 7b of the prongs immediately adjacent the diametrically opposite ends 6a of metal sheet 6 are displaced relative to the hose generally tangentially thereto. Therefore, the direction of displacement of the knife edges is such that the latter tend to slice into the outer surface of the hose, thus to promote penetration of the hose by the prongs. During such assembly operation, the knife edges of those prongs which are disposed inwardly of the diametrically opposite ends 6a of metal sheet 6 toward intermediate portion 6b thereof successively slice into the hose in a direction more radial with respect to the hose than those knife edges immediately adjacent the diametrically opposite end of the metal sheet, and the knife edges of the prongs adjacent intermediate portion 6b of the metal sheet slice into the hose substantially radially thereof. Thus, it will be seen that all of the prongs slice into the curved outer surface of the hose in planes generally transverse to the hose axis. This is due to the fact that the knife edges of all of the prongs extend generally circumferentially with respect to the coupling halves, and this orientation together with the diametrical direction of assembly promotes the desired ease of assembly and penetration of the prongs. Advantageously, there are no axially extending prongs providing planar surfaces transverse to the direction of assembly of the coupling halves to obstruct or restrain penetration.

Accordingly, the hose coupling of the present invention can be rapidly and simply mounted about the outer surface of a hose end. The only tools needed for the mounting of the coupling halves being a spanner and a suitable tool for severing the hose material adjacent the end of the assembled coupling halves. The actual seal in the hose coupling is established with the end of the hose itself and a sealing ring such as ring 14 shown in FIG. 1 and, therefore, the hose coupling itself is not exposed to any wear. This is highly advantageous since repeated use of the coupling is thereby made possible and the coupling can be mounted on a new hose whenever a given hose has become excessively worn or damaged. The coupling halves may be made of any suitable material and, for example, may be aluminum castings, and the metal sheets 6 can be suitably fixed on the inner surface of the corresponding coupling half such as by riveting.

While considerable emphasis has been placed on the preferred embodiment herein illustrated and described, it will be appreciated that other embodiments and modifications of the preferred embodiment can readily be made without departing from the principles of the present invention. In this respect, for example, the prongs could be struck from the metal sheets to provide a single prong extending along an opening as opposed to pairs of prongs on axially opposite sides of the openings, and the oblong openings could be other than of the ovate contour illustrated herein. Still further, the knife edges of the prongs could be other than of a radially arcuate contour, and the prongs could be formed on the metal sheet in patterns other than the symmetrical pattern shown in which the prongs are in circumferentially extending and axially spaced apart rows. It is only necessary in accordance with the present invention that the prongs project radially inwardly of the coupling halves in generally diametrical planes and that the knife edges of the prongs extend generally circumferentially of the coupling halves to promte penetration of the hose upon assembly of the coupling halves. Therefore, it is to be distinctly understood that the foregoing descriptive matter is to be interpreted merely as illustrative of the present invention and not as a limitation.

Having thus described the invention, what is claimed is:

1. In a coupling for non-metallic hose comprising two semi-circular coupling halves to receive the outer surface of a hose end therebetween, each of said coupling halves having two diametrically opposed, radially outwardly directed flanges extending axially along the hose coupling and a flange disposed at one end of the hose coupling directed radially outwardly transversely of the axial direction of the hose coupling, each of said coupling halves further having a semi-circular metal sheet fixed to the inner side of the respective half and formed with inwardly directed prongs to penetrate said hose radially inwardly from said outer surface thereof, the improvement comprising: all of said prongs being struck from said metal sheet to provide oblong openings through said sheet having circumferentially extending major axes and axially extending minor axes, all of said prongs being attached to said sheets along corresponding root lines extending in the direction of said major axes, whereby all of said prongs extend only circumferentially of said metal sheet, and said prongs having knife edges between the opposite ends of said root lines.

2. The improvement according to claim 1, wherein said metal sheets have axially opposite ends and said prongs are in circumferentially extending rows axially spaced apart in the direction between said opposite ends.

3. The improvement according to claim 1, wherein said openings are ovate.

4. The improvement according to claim 1, wherein said knife edges are radially arcuate between said opposite ends of said root lines.

5. The improvement according to claim 1, wherein each of said prongs lies in a curved plane intersecting the respective metal sheet along the corresponding root line.

6. The improvement according to claim 5, wherein said knife edges are radially arcuate and lie in the plane of the corresponding prong.

7. The improvement according to claim 1, wherein said prongs are in planes on axially opposite sides of said openings.

8. The improvement according to claim 7, wherein said openings are ovate and said prongs of each said pair of prongs lie in axially opposed curved planes intersecting the respective metal sheet along the corresponding root lines of said prongs.

9. The improvement according to claim 8, wherein said knife edges of said pairs of prongs are radially arcuate and lie in the corresponding one of said opposed planes.

10. The improvement according to claim 9, wherein said metal sheets have axially opposite ends and said pairs of prongs are in circumferentially extending rows axially spaced apart in the direction between said opposite ends.

* * * * *

UNITED STATES PATENT AND TRADEMARK OFFICE
CERTIFICATE OF CORRECTION

PATENT NO. : 4,150,848
DATED : April 24, 1979
INVENTOR(S) : Sven-Erik Dyrup

It is certified that error appears in the above-identified patent and that said Letters Patent are hereby corrected as shown below:

Column 6, line 5, "promte" should read --- promote ---; lines 17 and 18, after "coupling" insert --- half ---; line 19, after "coupling" insert --- half and means to clamp said coupling halves about said hose; line 32, after "lines" insert --- extending in the direction of said major axes ---.

Signed and Sealed this

Twenty-third Day of October 1979

[SEAL]

Attest:

RUTH C. MASON
Attesting Officer

LUTRELLE F. PARKER
Acting Commissioner of Patents and Trademarks